2 Sheets—Sheet 1.

W. HUMISTON.

Candle Mold.

No. 2,108. Reissued Nov. 14, 1865.

Witnesses
Charles D. Gellene
R. H. Mullen

Inventor
Willi. Humiston

N. PETERS. Photo-Lithographer, Washington, D. C.

W. HUMISTON.
Candle Mold.
No. 2,108. Reissued Nov. 14, 1865.
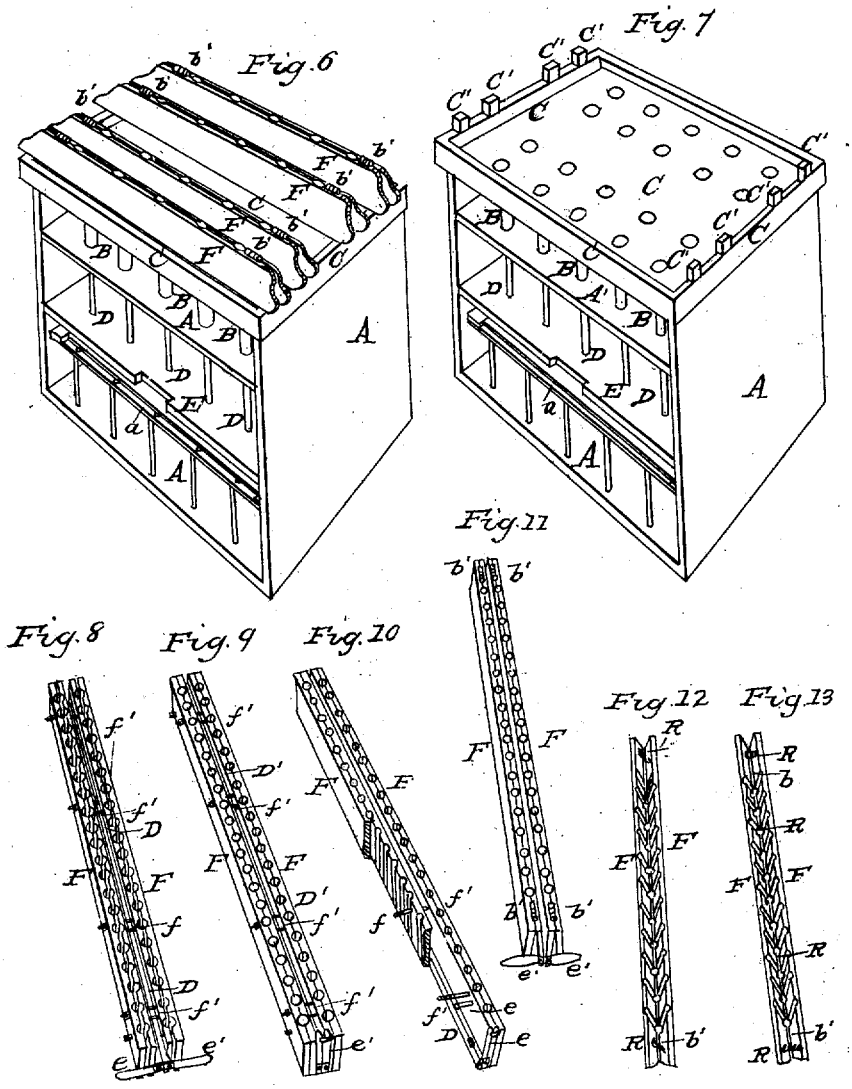
Witnesses
Charles D. Kellner
R. C. Rulle
Inventor
Willi. Humiston
N. PETERS, Photo-Lithographer, Washington, D. C.

UNITED STATES PATENT OFFICE.

WILLIS HUMISTON, OF TROY, NEW YORK.

IMPROVED CANDLE-MOLD APPARATUS.

Specification forming part of Letters Patent No. 13,334, dated July 24, 1855; Reissue No. 26, dated January 22, 1861; Reissue No. 2,108, dated November 14, 1865.

*To all whom it may concern:*

Be it known that I, WILLIS HUMISTON, of the city of Troy, county of Rensselaer, State of New York, did, on the 24th day of July, 1855, obtain of and from the United States of America certain Letters Patent for and upon new and useful improvements in candle-mold machine or apparatus, and bearing the title of "Improvement in Candle-Mold Apparatus," which said Letters Patent were duly surrendered and new Letters Patent were, on or about the 22d day of January A. D., 1861, issued upon a corrected and amended specification; and now, for the purpose of correcting, amending and re-forming the said Reissued Letters Patent, and the specifications, drawings, and claims thereof, so as to more fully bring out and understand my aforesaid-named invention, and to enable me to a better and more full protection of my rights in, to, and for the said invention and improvements, I do hereby declare the following to be a full, clear, and more exact description of my said invention and improvements, reference being hereby had to the accompanying drawings, and to the letters of reference marked thereon, which said drawings make a part of this specification.

Like letters represent and refer to like or corresponding parts.

For the purpose of a more full, correct, and perfect representation of my said invention by and from drawings, I have prepared two sheets, which I denominate "Sheet 1" and "Sheet 2."

Figure 1:
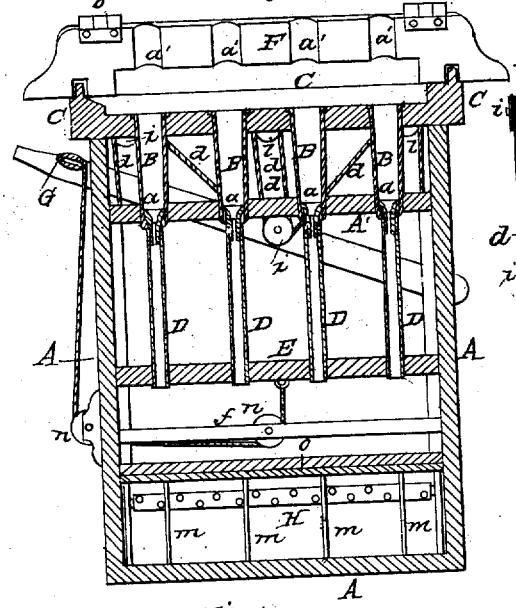
Figure 2:
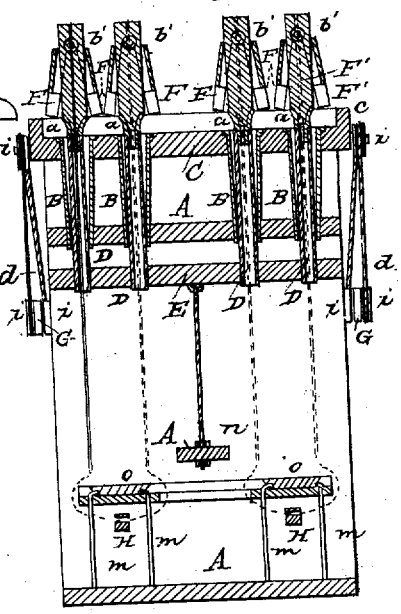
Figure 4:
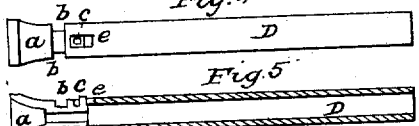
Figure 5:
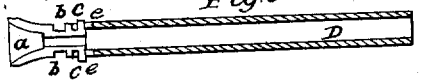
Figure 3:
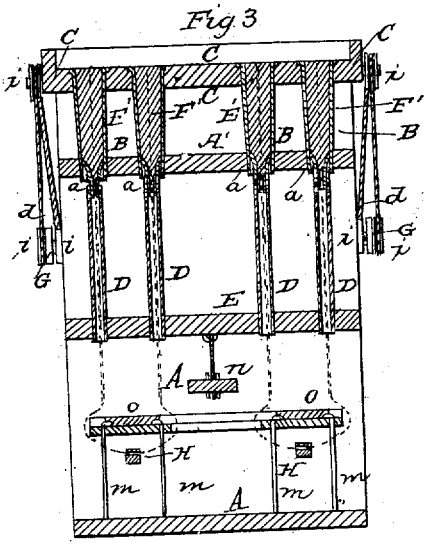

Figure 1, Sheet 1, is a vertical section lengthwise and on a line through the center of one row of vertical stationary candle-molds, and which are ready to receive the melted material from and by which the candles are to be made, substantially as herein described and set forth. Fig. 2 is a vertical section crosswise of the machine on a line through the center of the stationary candle-molds, and showing four rows of candles, with the candles ejected from said stationary molds into the candle receiving and supporting bars, which are there shown as being open for the purpose of receiving such candles, in the manner and for the purpose substantially as hereinafter described and set forth. Fig. 3 is a vertical cross-section, the same as that shown at Fig. 2, and showing the candles within the stationary candle-molds in the manner in which the same are formed therein, and which are ready to be pushed or ejected from such molds, in the manner and for the purposes substantially as herein set forth. This figure also shows the removal of the candle receiving and supporting bars from the machine and from over the said candle-molds, in the manner and for the purposes substantially as herein described and set forth. Fig. 4 shows, upon an enlarged scale, my improved candle-tip mold connected and combined with the pistons or ejecting-rod by means of a universal joint, in the manner and for the purposes substantially as herein described and set forth. Fig. 5 is a section through the center lengthwise of the said tip-mold and ejecting-rod seen at Fig. 4 aforesaid, and showing the form of the candle-tip mold and the small tube through which the candle-wick passes from the spool below, and the manner of connecting or combining the said tip-mold with the said ejecting-rod, each more fully hereinafter described and set forth. Fig. 6, Sheet 2, is a perspective of my said candle-machine, having therewith combined and arranged the candle receiving and supporting bars, constructed, combined, and for the purpose of receiving and holding the candles, in the manner and for the purposes substantially as herein described and set forth. Fig. 7 is also a perspective view of said machine with the said candle receiving and supporting bars removed therefrom, so as to show the arrangement of the candle-molds and the trough or vat connected therewith, and the manner of adjusting the said receiving and supporting bars, so as to center the wick for the candles, in the manner substantially as herein described and set forth, as well as to show that the said receiving and supporting bars are portable, for the purpose substantially as herein set forth. Fig. 8 shows my said candle receiving and supporting bars combined for two rows of candles, and operated together in the manner and for the purposes substantially as herein described and set forth. The said bars are in said Fig. 8 represented as being open, so as to receive the ejected candles, when the said bars are arranged upon the top of the said trough or vat and over the candle-molds in the manner substantially as herein described and set forth. Fig. 9 represents the same bars as those seen at Fig. 8, but closed by the means and for the purposes substantially as herein described and set forth. The said Figs. 8 and 9 also show the cross-rods, with nut and screw thereon and connecting and combining such bars, in the manner and for the purposes substantially as herein described and set forth. Fig. 10 shows the aforesaid bars with parts thereof removed therefrom, so as to show more fully the cross-bolts, with nut and screw thereon, in the manner and for the purposes substantially as herein described and set forth. Fig. 11 represents the said receiving and supporting bars in pairs and hinged together at the top for one row of candles, and then in one pair for two rows of candles, substantially as herein described and set forth. Figs. 12 and 13 represent the said receiving and supporting bars turned bottom side up, for the purpose of showing the coil, spiral, or other shaped spring operating between the aforesaid bars, in the manner and for the purposes substantially as herein described and set forth.

The nature of my said invention and improvements consists in the employment or use of a candle-tip mold connected to and combined with a piston or ejecting-rod by means of a socket or universal joint, and the combination of such candle-tip mold and piston or ejecting-rod with a vertical stationary candle-mold, so that the candles may be molded in large quantities or numbers in vertical stationary candle-molds, and then forced or ejected therefrom into the receiving or supporting bars immediately over and above such molds without injury to the candles or candle-tips, in the manner substantially as hereinafter described and set forth.

It also consists in the employment of vertical receiving and supporting candle bars, so constructed and arranged just above and over the vertical stationary candle-molds as to open laterally in a vertical line through or near the center of the holes or recesses made for the candles to be ejected from the said stationary candle-molds, and to receive such candles when ejected therein, substantially as herein described and set forth, and then closed or drawn toward each respective bar and the respective candles between the same, so as to hold or support such candles in the position in which they are ejected or forced from such vertical stationary candle-molds during the operation of the pouring into or filling the said molds immediately below such receiving and supporting bars, and thereby avoid the danger of breaking the said candles or their tips, in the manner substantially as herein described and set forth.

It also consists in the centering of the candle-wick for the candles by means of the candles themselves, ejected into and held or supported by means of the bars, which open and close in a vertical line through or near the center thereof, and which are brought into contact with the candles or some portions thereof by the closing or bringing of such bars toward each other and toward the candles respectively between the same, in the manner substantially as herein described and set forth.

It also consists in the employment of portable candle receiving and supporting bars, so constructed as to open laterally on a vertical line through the center, or near thereto, of the recesses or holes constructed upon the inner sides thereof, for the purpose of receiving the candles from the respective molds below as the same are being ejected therein in a vertical direction, and then to be closed toward each other, for the purpose of holding or supporting the candles ejected therein from the molds below while the wick is being severed between the candles so suspended and those molded in the stationary candle-molds below, and thereby enable the operator to remove from the main portion of the candle-machine the said supporting and candle-suspending bars, with the candles therein, to some convenient place to deposit such candles, in the manner substantially as herein described and set forth.

It also consists in the holding and suspending of the candles above the vertical stationary candle-molds by means of the receiving and supporting candle-bars, substantially as hereinafter described, and immediately over and above such candle-molds, respectively, while the candle-tip molds are being drawn or separated from the tips of the candles by means of the downward movement of the platform to which each piston or ejecting-rod is connected or combined, in the manner substantially as herein described and set forth.

It also consists in the employment of one or more springs of spiral or other form between each of the candle receiving and supporting bars over each row of candle-molds, and opening laterally in a vertical line through or near the center thereof, so that such bars may by means of such springs be thrown open laterally, ready to receive the candles as ejected from the molds below when the candles held or supported therein are removed therefrom, in the manner substantially as herein described and set forth.

It also consists in so constructing a candle-machine and arranging or combining the various parts thereof that by one continued upward movement or operation of the platen or platform, having thereto attached pistons or ejecting-rods, three or more rows of candles with tips in tip-molds will be ejected vertically from the vertical stationary candle-molds into the candle-receiving and candle-holding bars, opened laterally in a vertical line, so as to enable such candles to pass in and between the same, adjusted to and above each line or row of candles contained in each respective machine, in the manner substantially as herein described and set forth.

Heretofore in the manufacturing of candles by machinery it has been difficult to make them in large quantities at one operation of the machine, because but two rows of candles could be made or molded at the same time and operation of the machine and push or eject the candles vertically from the vertical stationary candle-molds—to wit, one row upon each side of such candle-machine, as is the case in the patent granted to one John Stainthorp on the 6th day of March, 1855, upon alleged improvements in candle-machines; but by the use of my vertical candle receiving and supporting bars, hereinafter described and set forth, I am enabled to mold three, four, five, six, or more rows of candles in the same machine at one time and operation thereof, and eject the candles vertically from the stationary candle-molds at one upward movement of the platen or platform upon which and to which the lower ends of the piston or ejecting rods are attached, substantially as hereinafter described and set forth; and there has also been great difficulty in disconnecting or separating the candle-tips from the tip molds in which the same were formed when large quantities or numbers of candles were molded at the same time and pushed or ejected from such molds vertically, and at the same time center the wicks for another pouring of melted material to form the next set of candles without injury to the body of the candles or without breaking more or less of the candle tips during the operation and marring the body of the candles in removing the same from the machine after the wicks are severed, as is the case in the rack-tip bar and clasps or rack and tip bar contained in the said patent granted to said John Stainthorp on the 6th day of March, 1855; but by the invention and by the improvements which I have made, and which are herein described and set forth, all these difficulties are fully overcome, and I am thereby enabled to make for and furnish to the market a candle-machine in and by which candles are made in large numbers or quantities at one operation of the machine without injury to the body of the candle or injury to the tips thereof, and which may be continued and repeated in succession until all the wick contained upon the spool below is exhausted or used up, substantially as hereinafter described and set forth. There are other and minor difficulties which have heretofore attended the successful manufacture of candles by machinery which have been fully and completely overcome by my said invention and improvements, and which I have not deemed necessary to describe in this specification, for my improvements will be manifest and appear as I proceed to describe the same at large or in full hereinafter.

Having thus described the nature of my said invention and improvements, and to enable others skilled in the art to which the same relates to make and use the same, I will here proceed to describe their construction and operation, which are as follows, to wit:

I construct the general or outside frame, A, of my candle machine of wood or iron, and of any size or form which may be desirable. Upon the upper part of the said frame I arrange and construct the reservoir or trough or vat C, for the purpose of receiving and retaining any excess of tallow or other material by or from which the candles are made or molded in the vertical stationary molds after such molds have been filled for the making of candles, and it may be of any capacity required.

B B, &c., represent the stationary candle-molds, and in form like unto a hollow tube or cylinder, and they are arranged in a vertical position in rows and in pairs of rows, containing in each pair two rows of candle-molds, substantially as seen at Figs. 2 and 3, Sheet 1, and Figs. 6 and 7, Sheet 2 of the drawings. In these molds thus arranged the candles are cast or molded. The vertical stationary position of these molds is not new, except the arrangement of such molds in pairs of rows, as afore stated, and for the purposes herein described and set forth. The vertical stationary position of such molds was contained in and may be found in the well-known "hand candle-mold stand" used more than thirty years ago, and such may also be found in the candle-machine invented and patented by one Joseph Morgan, in England, in the year 1834, and may also be found in the candle-machine patented to Willis Humiston, of the city of Troy, county of Rensselaer, and State of New York. The upper ends of the said candle-molds are firmly secured in or to the bottom of the said reservoir or trough C by any good and substantial means which will answer the purpose. From the said reservoir or trough C the said candle-molds so secured therein and thereto extend downward vertically for a distance equal to the length of the candles required to be molded and are there firmly secured by means of a short tube screwed into a wood or iron piece, A′, or part of the frame A, constructed and arranged for that purpose, into the upper end of said short tube. The lower end of the said vertical stationary molds may extend to a short distance, and then and there each will be firmly fastened together by means of solder or otherwise, whereby a perfect joint is made, and at the same time form a shoulder for the candle-tip mold to rest upon, which is done by making the lower end of such short tube smaller than the diameter of the lower end of such candle-mold, and thus form a shoulder upon the inner side of the candle-molds of sufficient capacity to answer the purpose required, and thereby prevent any escape of tallow or material from which the candles are made at the time of the molding of the same and before the cooling thereof. The said frame A′, which contains and supports the lower ends of said candle-molds, may be constructed and combined with the other parts of the frame A in any good and convenient manner, and it may be of wood or wrought or cast iron. Instead of raising the said short tube, hereinbefore described for the purposes aforesaid, the immediate lower ends of said candle molds may extend directly into the said wood or iron frame A′, constructed so as to receive and support the said candle-molds, as aforesaid. I however much prefer the use of the short tube aforesaid, which may extend down and entirely through the said frame A′, which supports the lower ends of the said candle-molds, as aforesaid, and there contain and receive a nut fitted to the screw thereon, and thereby more firmly hold said lower end of said candle-molds, for the purposes aforesaid. The said stationary candle-molds, candle-tip molds, short tube, and piston or ejecting rods may be constructed of any material which will answer the required purpose.

D D, &c., are the pistons or ejecting-rods, connected to and combined with the candle-tip mold *a a*, &c., in the manner and for the purposes substantially as herein described and set forth. The said rods D are at their lower ends respectively connected to and combined with the vertical upward and downward moving platform or platen E in any good and convenient manner, and the said rods will of course move upward and downward with the candle-tip molds *a a*, combined therewith, as aforesaid, whenever the said platen or platform is moved in either direction by any means suitably constructed for the purpose, by means of which the candles within the said candle-molds, with their tips within the said tip-molds, are pushed upward or ejected from the said candle-molds up and into the candle receiving and supporting bars, in the manner substantially as herein described and set forth. The said candle-tip molds *a a*, &c., are made in diameter of the size of the lower ends of the said vertical stationary molds in which the candles are molded. The said candle-molds are so constructed as to make tapering candles, and which are somewhat larger at their upper ends than at the lower or tip ends thereof, and thus give a better form or appearance to the candle. The shape and length of the said candle-tip molds *a a*, &c., may be as desired. The said tip-molds *a* form the tips of the candle during the operation of the molding of the main portion or body of the candles in the said vertical stationary candle-molds B. The lower part of the said tip-molds slide into the upper end of the said piston or ejecting rods D to any required distance, and have upon their opposite sides stops *c c*, Figs. 4 and 5, and which project through the slot-mortises *e e* in the said piston or ejecting rods D, same figures. *b b*, same figures, show the place allowed for the movement of the said candle-tip molds *a* and the said piston or ejecting rods D, and therefore the movements of each are limited, and the same will permit or allow a sudden, quick, and upward blow to be given to the said candle-tip molds *a*, whereby the same is communicated to the candles in their respective molds, and the same, by reason thereof, are released from and started upward by the force thus attained, and they are thereafter easily carried upward and out of said candle-molds and into the candle receiving and supporting bars by the use of said piston or ejecting rods, the said candle-tip molds, and the platen or platform E, the lower ends of the said piston or ejecting rods D being attached to and combined with the said platen or platform E, substantially as shown at Figs. 1, 2, and 3, Sheet 1, and Figs. 6 and 7, Sheet 2, of the drawings. It will therefore be seen that by the upward movement of the said platen or platform E, with said pistons or ejecting-rods thereto attached, the said rods at their upper ends come in contact with the lower ends of said candle-tip mold, or against the shoulder thereon, which is made by the formation of the joint or connecting piece which unites the said tip-molds and said ejecting-rods, and thus and thereby impart the said upward, quick, or sudden blow to said candle-tip molds and candles therein, as aforesaid. The said piston or ejecting rods D may be in diameter of any convenient size, and are hollow, so as to allow the candle-wick to pass up through the same into and through the said candle-tip molds *a*, and thence up and through the center of the said vertical stationary candle-molds B, and they will be made sufficiently strong to answer any purpose required of them, and of any length required to push the candles from said candle-molds up and into the said candle receiving and supporting bars, hereinafter more fully described and set forth. The said joint between the said candle-tip molds and the said piston or ejecting rods may be otherwise constructed so as to answer the same end and purpose. By means of the said joint or its equivalent the said candles, in being pushed upward and out of said candle-molds and into the said candle receiving and supporting bars, in the manner aforesaid, will be permitted to vibrate or yield somewhat, so as to conform to any unevenness or irregularity in the upward movement of the platen or platform E, or to any irregularities in the arrangement or adjustment of the said candle receiving or supporting bars upon and to the said reservoir or trough C, and thus and thereby prevent any injury or liability to injury to the body of the candles, and also prevent any injury or liability of injury to the tips of the candles while being started from the said candle-molds and pushed or carried upward and into the said receiving and supporting bars and during the receiving and supporting of such candles by said bars, so as to hold the candles while the tip-molds are being drawn therefrom and the wick centered for the next set of candles below, substantially as herein described and set forth.

I construct and arrange directly over each series or line of candle-molds a set of candle-receiving and candle-supporting bars made in two parts, and which open lengthwise in a lateral direction on a vertical line through or near to the center of the recesses or holes upon the inside of such bars and directly over each candle-mold below, which said recesses or holes are each constructed of any diameter or size required to properly receive and hold the candles, respectively, for the purpose of allowing the said tip-molds *a* to be drawn from the tips of the candles, and at the same time correctly center the wick for the next set or series of candles to be molded in said stationary tubes while the former set of candles remain thus suspended above such molds, and until the candles so moulded in the said moulds are sufficiently cool to permit of the severing of the wick between the tips of the candles so received, held, and suspended and the upper or larger ends of the candles so molded in the said molds just below, as aforesaid. The said candle receiving and supporting bars may be seen at Figs. 1 and 2, Sheet 1, and Figs. 6, 8, 9, 10, 11, 12, and 13, Sheet 2. These receiving and supporting bars remain stationary during the operation of molding the candles below, and are only designed to be removed from the machine when the candles received therein and held or supported thereby, substantially as and for the purposes herein described and set forth, are separated from the candles in the molds below by the cutting of the wick between each, as aforesaid. The said bars are made of any sufficient height or depth so as to receive and hold the candles by bringing each part toward each other in a vertical position and against the candles or some portions thereof as the same are received therein when ejected out of and from the stationary candle-molds below in which the same were molded. The candles are thus and thereby held, as aforesaid, and at the same time and operation center correctly the wick for each candle next to be molded below while the said candles are thus held and suspended, as aforesaid. The said candle receiving and supporting bars may be seen at F, Figs. 1 and 2, Sheet 1, and Figs. 6, 8, 9, 10, 11, 12, and 13, Sheet 2 of the drawings, as before stated. At Fig. 2 each part and set combined are shown as being open, ready for use, and with the candles F′ ejected between the bars F, in the manner hereinbefore described, and ready to be supported by means of said bars when brought toward each other and toward the said candles in a lateral direction, whereby the sides, or some part or parts thereof, of the aforesaid recesses or holes *a′*, Fig. 1, Sheet 1, and Figs. 6, 8, 9, 10, 11, 12, and 13, Sheet 2, are brought into contact with and so as to hold the said candles F′ while the aforesaid candle-tip molds are drawn from the tips of the candles thus received and held, as afore stated.

Upon the inner sides of the said receiving and supporting bars F, I construct recesses or holes *a′*, which are made of any desirable or suitable size to correspond to and with the size of the candles to be made or molded in the molds below. The said recesses or holes *a′* may, if desirable, be made somewhat larger at the top than at the bottom, or they may be made larger at the center, between the bottom and top of the said bars, than at the top or bottom of the said holes or recesses, all depending upon what part or portion of the said candles it is desirable to bring the said bars or parts of said bars into contact with, so as to sustain or support the candles, for the purposes aforesaid. There will of course be as many such recesses or holes in each set of such bars as there are of said candle-molds in each line or single row. It will require two sets of such bars to each double row of said candle-molds, and the two sets may be operated together at the same time by means or use of any mechanical device operated in any way or manner thought best. The said bars are opened and closed laterally on a vertical line, substantially as shown at Figs. 1 and 2, Sheet 1, and Figs. 6, 8, 9, 10, 11, 12, and 13, Sheet 2, of the drawings, which vertical line will be lengthwise of the candle-machine and through or near the center of the aforesaid recesses or holes *a′*. The said receiving and supporting bars F may be made to open and close in various ways and by use of various arrangements of mechanism, all of which are equivalents for closing the respective parts of the said bars upon or against the said candles or some parts or portion thereof, in the manner and for the purposes aforesaid. At Figs. 1 and 2, Sheet 1, the said bars are shown as being hinged together at the top thereof by means of the hinges *b′ b′*, which I generally locate at or near each end of the said bars. The said bars, so hinged, may also be seen at Figs. 6, 11, 12, and 13, Sheet 2, of the drawings. At Fig. 6, Sheet 2, the said bars, so hinged, are correctly adjusted to the reservoir or trough C and over the said candle-molds, and are opened laterally on a vertical line, ready to receive the candles to be ejected from the said molds below. At Fig. 7, same sheet, may be seen the projections *c′*, which are for the purpose of receiving the respective ends of such candle receiving and supporting bars and correctly adjusting the same to each line of candle-molds below, so as to properly receive the ejected candles and hold the same for the withdrawal of the tip-molds, and to center the wick for the next series of candles, substantially as aforesaid. At Figs. 8, 9, 10, and 11, Sheet 2, may be seen the aforesaid bars arranged and combined in pairs of four bars each and for two rows of candles. These bars are operated laterally on a vertical line, as aforesaid, by means of center bar extending lengthwise of the same and between the two sets of said receiving and supporting bars F, and it may be constructed in one, two, or more parts. It may be seen at *d′*, Fig. 8, Sheet 2, with the bars F in an open position, so as to receive candles. The said bars F are closed, as shown at Fig. 9, by means of the said center bar, *d′*, which is operated by means of the arms *e′*, same figure, which, when brought together, as shown at Fig. 9, then the said bars F will be closed, substantially as seen at said Fig. 9, for the said center bar, $d'$, is thus made to act upon and against the sides of the inner bars F next thereto, and the said inner bars will be forced or moved toward the candles and at the same time draw the outside bars, F, toward the candles, which is done by the connection of each inner bar F with the outside bars F by means of the horizontal and cross rods or bolts $f'$, Figs. 8, 9, and 10, and such rods or bolts $f'$ each having upon their respective outer ends nuts and screws, substantially as seen at same figures, which said nuts and screws are for the purpose of correctly adjusting the said respective bars F to the size of the candles made in and ejected from the stationary candle-molds below, and also to prevent the outside bars of the said candle receiving and supporting bars from spreading outward from the candles at or near the center between the hinges upon the top of said bars F, as aforesaid, when the same are brought to and against the said candles or some portions thereof, as aforesaid. The said center bar, $d'$, may be constructed in two parts, opening lengthwise of the same, with proper hinges to operate the same; or it may be constructed in one flat piece of sufficient width so that when it is moved or turned down the edges thereof will operate against the inner bars F, and thereby move the same outward therefrom, and the outside bars in toward the said inner bars moving outward, substantially as aforesaid, and by means of the said horizontal cross rods or bolts $f'$, arranged and combined substantially as aforesaid, and as shown at the said figures of Sheet 2 of the drawings. The said bars F, I usually construct of wood, and of any thickness or height to answer the purpose required. They are portable, and are adjusted to and arranged over the respective line of candle-machines substantially as aforesaid. They may be hinged at the upper edge thereof, substantially as shown at Figs. 1 and 2, Sheet 1, or Figs. 6, 11, 12, and 13 of Sheet 2; or they may be constructed and used without hinges, substantially as shown at Figs. 8, 9, and 10, Sheet 2, of the drawings. In either case they will be adjusted to and arranged upon the said reservoir or trough C and over each line of said candle-molds in substantially the same manner and means, and for the same purpose. The invention and improvements being in each case substantially the same and for the same purpose, as aforesaid, any suitable means may be employed for the purpose of receiving the respective ends of the said candle-receiving bars F upon the reservoir or trough C, and for correctly adjusting said bars F and holding them over said candle-molds while the candles are being ejected therein, the wick centered in the molds below, the next series of candles molded, and the wick between the suspended candles and the molded candles in the molds below are severed, in the manner substantially as aforesaid. For this purpose I have shown at $g'$, Fig. 6, Sheet 2, ears or upward projections, so arranged and constructed as to hold the said receiving and supporting bars F, substantially as aforesaid. The said bars may be so constructed at their respective ends as to be placed upon the immediate upper edge of the end of said reservoir or trough C, for the purposes aforesaid.

At Figs. 12 and 13, Sheet 2, may be seen two of the said candle receiving and supporting bars F turned bottom upward, so as to show the springs R, which open the said bars F in a lateral direction on a vertical line lengthwise of the same and lengthwise of the machine whereon they are arranged and combined, substantially as and for the purposes aforesaid. These springs may be of any desirable form or shape. At R, Fig. 12, Sheet 2, I have shown a long or flat spring, while at R, Fig. 13, same sheet, I have shown a coil or spiral-shaped spring. There may be one, two, three, four, or more such springs used between the said bars F, opening as aforesaid over each line or row of candle-molds. The said springs R may be located at or near the ends of the said receiving and supporting bars F, or at any other point or place which may be desirable, in order to open said bars in the manner substantially as aforesaid. They will of course be between each set of such bars, constructed in two parts or pieces, substantially as seen at the said Figs. 12 and 13, and each pair of said bars, containing two sets of bars—to wit, four parts or pieces—will also contain the aforesaid springs, constructed, arranged, and combined substantially as aforesaid. It will be seen that the said springs will throw open said bars in a lateral direction, on a vertical line lengthwise of the same, so as to be ready and in proper condition to receive the ejecting and ejected candles from the stationary candle-molds below, as aforesaid. The said springs will thus operate the said bars whenever the aforesaid center bar, $d'$, is turned from a horizontal toward a perpendicular position, thereby relieving the inner bars F from any pressure or friction caused by said center bar being turned downward for the purpose of closing the said bars F, in the manner and for the purposes substantially as aforesaid. The length and strength of the said springs R will depend somewhat upon the size of the said candle receiving and supporting bars F and the number of candles to be contained within each set of such bars and pairs thereof, constructed substantially as aforesaid. It will therefore be seen that by the said bars being thus opened laterally on a vertical line lengthwise of the same the candles, as they are being ejected from the said molds, will pass up between and into the said bars F until they are entirely ejected from the said molds without any injury to the body of the candles or injury to the tips of the candles, as aforesaid. The said candles are guided upward by means of the said bars, opened substantially as aforesaid, and when they are thus carried up to a proper position, then the said bars are brought toward each other and up to and against the candles themselves, or some parts or portion thereof, and thus and thereby center the wick for the next series of candles below, and at the same time sufficiently hold the said candles thus suspended while and until the candle-tip molds *a* are each drawn or separated from the tips of the candles thus vertically received, held, and suspended by the said bars F. The said separation of the said candle-tip molds from the said candle-tips will take place whenever the said platen or platform E, which contains the said piston or ejecting rods D, is lowered, which, when done, the said candle-tip molds will be drawn downward with the said piston or ejecting rods, and the candle-wick, passing through the center of said candle-tip molds, will become somewhat strained or tightened, and thus brought on a center line through the said vertical stationary candle-molds, and thus made ready for the pouring or molding of the next set or series of candles, while the set or series thus ejected will remain in and suspended by the said bars F until the candles below are cooled sufficiently to allow of the cutting or severing of the wick between the suspended ones and those remaining in the molds below, which, when done, the aforesaid bars F may be respectively removed from the said reservoir or trough C, with the candles suspended therein, and the same may be carried to some convenient place of deposit; or the said candles may be taken directly from the said receiving and supporting bars F and deposited into boxes or other receptacles preparatory to being sent into the market for sale.

Another advantage gained by the use of my aforesaid portable candle receiving and supporting bars F is as follows, to wit: First, there is full and ample room at the side of the said reservoir or trough C for the pouring of the melted material from which the candles are made in the said stationary candle-molds; second, the said bars F may be removed, so that the extra material which has accumulated in the said reservoir or trough C, after the said molds have become filled with the material aforesaid, may be removed therefrom by means of a scraper, and thereby not only save the said material, but even up or nicely finish the butts of the candles in the molds below before the same are ejected therefrom into the said lateral open bars F; and, third, the candles thus ejected into said bars F may be carried thus suspended to some convenient place, and there taken from such bars and packed into boxes for the market without soiling or in any manner injuring the body of the candles or the tips thereof, in the manner substantially as hereinbefore described and set forth.

The candles molded in the vertical stationary molds B are, when ready, pushed or forced therefrom by means and use of the piston or ejecting rods D, connected at their respective upper ends with the lower end of the candle-tip molds *a*, as hereinbefore described and set forth, while the lower ends of the said ejecting-rods are firmly secured to the said movable platen or platform E by any suitable mechanical means thought best to use. The said movable platen or platform E, the said ejecting-rods D, and the said candle-tip molds *a* operate together for the purpose of pushing or forcing the candles from their respective molds B. The said platen or platform E and the said piston or ejecting rods D operate or move upward together, and give a quick or sudden blow to the said candle-tip molds *a*, thus and thereby starting the candles in the said vertical stationary candle-molds B, and then continuing the same onward, upward, and entirely out of the said candle-molds into the aforesaid portable candle receiving and supporting bars F, in the manner and for the purposes substantially as hereinbefore described and set forth. The said movable platen or platform E may be operated by levers and pulleys, or it may be operated by means of gearing properly constructed for that purpose. I much prefer the gearing. When the candles are thus ejected out of said molds and into said receiving and supporting bars F, and the said bars are brought toward each other and to bear upon or against the candle or some portion thereof, thus and thereby supporting and holding them in a vertical position over said molds, substantially as aforesaid, then the said platen or platform E is moved downward, carrying with it the said piston or ejecting rods D, which also at the same time moves downward the said candle-tip molds, which are connected to and with the said ejecting-rods D, as hereinbefore described and set forth, which, being thus operated, prepares the machine for another operation, pouring and molding candles therein, the wick having been carried up and arranged ready for use at the time and operation of ejecting or pushing upward and out of the said molds the candles therein made, as aforesaid. The said wick is taken from wick-balls on the spindles *m*, as shown by the red lines passing through the said piston or ejecting rods D, through the candle-tip molds *a*, into and through the candle molds B, Figs. 2 and 3, and then continues onward through the said candle-molds B into and through the candles received and held in the bars F, opening and closing substantially as aforesaid, until the said wick is severed or separated, as aforesaid. The said wick may be stretched by means and use of the shaft H, having holes therein to pass through the wick, as seen at Fig. 1, Sheet 1, if deemed necessary so to do; but the wick will ordinarily be sufficiently stretched by the downward movement of the said candle-tip molds *a* in the manner aforesaid. Any desirable number of said stationary candle-molds may be arranged in one line or row, and two such lines or rows will constitute one set of rows, with the aforesaid bars F constructed and arranged immediately over the same, in the manner and for the purposes substantially as aforesaid. Any desired number of sets of rows may be constructed and used in one machine, substantially as hereinbefore described and set forth. It will therefore be seen that a machine may thus be constructed and arranged for any desired number of rows and sets or pairs of vertical stationary candle-molds, thereby giving any desired capacity to each machine and for each operation thereof, substantially as hereinbefore described and set forth; and it will also be seen that a candle-molding machine thus constructed, arranged, and combined, is more simple, requires less labor to manufacture candles, is durable and economical, and removes all liability of breaking the candles or the tips thereof during the manufacturing operation and in getting the same ready to box for the market and for sale, all of which are very important and of great value to candle-manufacturers.

Having thus described my said invention and improvements, what I claim, and desire to secure by Letters Patent of the United States, is—

1. The combination of the candle-tip mold *a* with the piston or ejecting rod D, in the manner and for the purpose substantially as herein described and set forth.

2. The combination of the said candle-tip mold *a*, arranged and combined with the said piston or ejecting rod D, with the vertical stationary candle-mold B, in the manner and for the purposes substantially as herein described and set forth.

3. The receiving of the candles in and by the vertical candle-supporting bars F in the position in which they are ejected or pushed from the vertical stationary candle-molds B, and the closing of the said bars F with the candles therein, and thus and thereby holding them during the operation of the pouring into or filling the said molds immediately below said receiving and supporting bars F, and thereby avoid the danger or liability of breaking the said candles or their tips, substantially as herein described and set forth.

4. The adjusting and holding the wick (for the candles) in the center of the said vertical stationary candle-molds B by means of the said candle receiving and supporting bars F, and the candles therein held or supported by means thereof, in connection with the candle-tip molds *a*, each arranged and operated in the manner substantially as herein described and set forth.

5. The employment of the candle receiving and supporting bars F, so constructed and arranged as to open laterally on a vertical line lengthwise of the same, to receive the ejecting candles and to close with such candles therein, by the means substantially as herein described, and so arranged over and above the said vertical stationary candle-molds B as to hold said candles therein until the wick is severed between the candles so suspended and those molded in said stationary molds below, and thereby allow of the removal (when necessary) of such candle receiving and supporting bars F, with said candles therein, in the manner substantially as herein described and set forth.

6. The employment of portable candle receiving and supporting bars F, which may be opened and closed laterally on a vertical line lengthwise of the same, immediately above and near the center of the vertical stationary candle-molds B, and so arranged and combined with the candle machine-frame or trough *c* that the same may, whenever desirable, be removed therefrom, with the candles which have been ejected therein from the stationary molds below, in the manner substantially as herein described and set forth.

7. The holding of the candles F′ suspended over and above the vertical stationary candle-molds in and by the said candle receiving and supporting bars F, while the said candle-tip molds *a* are being separated or drawn from the tips of the said candles by means of the lowering or downward movement of the platform E, to which the piston or ejecting rods D are attached and combined, in the manner substantially as herein described and set forth.

8. The employment of one or more springs, R, constructed of spiral or other shape, in combination with the said vertical candle receiving and supporting bars F, and operating between such bars for the purpose of opening the said bars laterally on a vertical line lengthwise of the same, so as to allow the candles being ejected from the vertical stationary candle-molds to enter or pass between the same, in the manner substantially as herein described and set forth.

9. A candle-machine so constructed, arranged, and combined that by one continued upward movement or operation of the platen or platform E, having thereto attached the said piston or ejecting rods D, three or more rows of candles will be ejected vertically from the vertical stationary candle-molds and into the candle receiving and supporting bars F, opening laterally on a vertical line lengthwise of the same at or near the center thereof and immediately over and above the said stationary candle-molds B, in the manner substantially as herein described and set forth.

10. The starting of the candles from the said candle-molds B by giving a sudden blow to the candle-tip molds *a* and to the candles therein by means of the upward movement of the platen or platform E, with the said piston or ejecting rods D thereto attached, in the manner substantially as herein described and set forth.

In testimony whereof I have, on this 6th day of November, A. D. 1865, hereunto set my hand.

Witnesses: WILLIS HUMISTON.
CHARLES D. KELLUM,
R. H. REILLY.